Patented Mar. 8, 1938

2,110,732

UNITED STATES PATENT OFFICE 2,110,732

COFFEE BALL

John P. Kane, New York, N. Y.

No Drawing. Application August 28, 1933,
Serial No. 687,165

4 Claims. (Cl. 99—71)

The present invention relates to coffee balls and to a process of making the same.

It is well known that attempts have been made to provide the public with soluble coffee products whereby a cup of coffee could be produced instantly. Generally speaking, the more important prior products were soluble liquid coffee extracts or soluble solid coffee extracts. The solid extracts were used in the form of a fine powder or in the form of a molded pellet, tablet or the like. The coffee which was made by the use of such concentrated extracts of coffee tablets did not possess the characteristics of a fresh cup of coffee. The most serious objection to the prior soluble coffee products was that such products lacked the aroma and taste of freshly roasted coffee. Various proposals were made to impart coffee aroma to soluble coffee. Of the various proposals, a more important one was an attempt to impart coffee aroma to soluble coffee by mixing freshly roasted coffee berries either in a ground or an unground condition with soluble coffee. By maintaining soluble coffee in intimate contact with the freshly roasted coffee some of the coffee aroma was expected to be absorbed by the soluble coffee. The ground or unground roasted coffee was separated from the soluble coffee by screening or the like. When such a product was used to make a cup of coffee by a consumer it was found that the cup of coffee so made did not have the aroma and taste which characterizes a fresh cup of coffee. Another proposal involved the grinding of roasted coffee beans with dry coffee extract to a powder of such fineness as to be capable of suspension in the subsequently prepared beverage or cup of coffee. The theory underlying this proposal was that the roasted coffee would be distributed throughout the cup of coffee in a state of suspension and in such a fine condition that the consumer of the cup of coffee would obtain the taste and aroma of the roasted coffee without objecting to the fine insoluble particles and sediment of roasted coffee. Although various proposals and attempts have been made to solve the outstanding problem confronting the art, nevertheless, no wholly successful and satisfactory solution has been provided and the cups of coffee which have been made in accordance with the prior suggestions are very weak and muddy and have been unacceptable to the consumer.

I have discovered a coffee ball which is free from the disadvantages and shortcomings of prior soluble coffee products and which is capable of producing a cup of coffee with the aroma and taste of a beverage made from freshly roasted coffee.

It is an object of the present invention to provide a coffee ball which can produce a cup of coffee directly in a cup with hot water practically instantly.

It is another object of the invention to provide a coffee ball which can be made practically and economically on an industrial scale and which can be produced, handled, shipped and stored as a stable and reliable article of commerce.

It is a further object of the invention to provide a process of producing soluble coffee which from the prepared beverage has a "body" closely resembling that of coffee prepared from freshly ground beans.

It is also within the contemplation of the invention to provide a coffee mixture of soluble coffee and ground, freshly roasted coffee which can be handled in a balling machine for the production of coffee balls.

Other objects and advantages of the invention will become apparent from the following description:

Generally speaking, the invention contemplates the combination of a porous container, a portion of a solid soluble coffee product capable of dissolving through the walls of said container and providing the "body" of a cup of coffee and the rich, natural coffee color, and a portion of freshly roasted coffee capable of providing a fragrant aroma and a delicious flavor while being incapable of passing through the walls of the container and into suspension in the subsequently prepared cup of coffee. In the preferred embodiment of the invention, I provide a relatively small bag or sack made of gauze or open-mesh fabric which contains a charge of dry, soluble coffee product and a requisite amount of coarsely crushed, roasted coffee having a grain size larger than the meshes of the gauze or fabric. For best results, a soluble coffee product is utilized which is made by my "cold" or "low temperature" process as described more fully hereinafter.

By pouring hot water upon a coffee ball embodying the foregoing novel combination a cup of coffee may be quickly produced which has a fragrant aroma, a delicious taste, a strong "body" and a rich natural coffee color and which is free from muddiness, bitterness or a caramelized burnt or over-boiled taste. In other words, a cup of coffee can be produced with my improved coffee ball which is practically the same as a cup prepared wholly from freshly roasted coffee and which the average coffee drinker can not distinguish therefrom in a "blindfold test".

For the purpose of giving those skilled in the art a better understanding of the invention the following description will be given of an illustrative and specific example.

In carrying the invention into practice, a dry soluble coffee product is prepared in any appropriate manner. It is preferred to produce the dry soluble coffee product by a "cold process" which will be explained in detail hereinafter. For convenience, the product of the cold process will be known as cold coffee extract. The coffee extract may be in any desirable form but it is preferred to utilize the coffee extract as a dry powder which will dissolve rapidly in hot water.

The freshly roasted coffee, which is to be mixed with the soluble coffee extract, is treated according to any of the conventional procedures. After roasting, the coffee is preferably crushed and screened to give a screened coffee of about 10 to 25 mesh. Although the foregoing size of crushed coffee is preferred, finer or coarser coffee may be employed. Thus, for instance, coffee having a size of about $\frac{1}{16}$ or $\frac{1}{8}$ of an inch or even broken or whole beans may be used. With the coarser material, a longer time and larger amounts are required in making the cup of coffee. In the same way, the crushed coffee may have a smaller mesh than 25 but it has been found for practical purposes that 50 mesh is about the limit in fineness. When the coffee is ground too fine instead of merely being crushed, it has been discovered that the difficulties and troubles of the prior art are encountered. Thus, for instance, the pores of the containers may become clogged; secondly the cup of prepared coffee may become filled with a fine suspension of insoluble coffee powder; and thirdly, if the coffee is too fine there is a tendency of the entire mass to clump within the porous container thus preventing or retarding complete and rapid solution. All of the aforesaid disadvantages are highly objectionable and are vital defects in some of the prior coffee products.

For practical operations, it has been found to be preferable to mix about 125 parts by weight of dry soluble coffee product or extract with about 100 parts by weight of freshly roasted crushed and screened coffee. In carrying out this operation great care should be exercised that the screening is effected very lightly and gently in order to overcome the production of fines which are to be avoided. The mixture may then be packed into little bags, sacks or other suitable containers. For commercial operations, it is preferred to convey the coffee mixture to a balling machine. The fabric or gauze which is used in the machine for making the little bags preferably be about 50 mesh and should preferably be made of cotton. Of course, care should be taken that the gauze or fabric has been washed thoroughly and has been freed from lint. For practical purposes, the gauze may be dyed or tinted with a material which is insoluble in both cold and hot water and which does not react with coffee. It is preferred to employ a tan or brownish color.

In filling the little bags or containers the balling machine is adjusted to deliver a charge which contains about 2.5 grams of soluble coffee extract and about 2 grams of crushed, roasted coffee. Each bag is preferably wrapped in a moisture proof medium, such as "Cellophane." Of course, other protective devices and materials may be employed. The wrapped bag is then packed in cartons or cases in the usual manner. These cases can be handled and shipped like other articles of commerce or canned products and can be stored in any appropriate manner and can be displayed on the shelves of a store, such as is customary in grocery stores or the like. The consumer can keep the can or carton in a closet and withdraw the desired number of coffee balls at any time.

In using my improved coffee ball, I prefer to place the ball in the bottom of a cup and pour boiling water having a temperature of about 80° C. to about 100° C. over the same. A practical temperature of the hot water is about 90° C. to about 95° C. In pouring the water over the coffee ball, it is preferred to hold the ball in the bottom of the cup and to agitate the same in order to effectively and rapidly dissolve the soluble coffee and to extract the aroma, flavor, etc. from the crushed, roasted coffee. Of coarse, the hotter the water and the longer the contact with the coffee, the better will be the aroma and flavor of the cup of coffee. Colder water may be used but it is not recommended as the aroma and flavor will then only be present to a smaller extent. In carrying out the foregoing procedure in the preparation of a cup of coffee, it has been found that only a short time is required. Tests have shown that a cup of coffee can be made with my improved coffee ball in about a minute or so and under favorable conditions only 40 seconds are required. As a result of these tests it has been demonstrated that my coffee ball gives uniformly good coffee which can not be distinguished in "blindfold tests" from coffee prepared from freshly roasted coffee according to conventional procedures.

As pointed out hereinabove, I prefer to use a cold water extraction process in making the coffee extract and to employ a low temperature process for the production of the coffee extract. My preferred procedure involves "cold" or "low temperatures" up to about 40° C. for concentrating the liquid extract. In practice, a temperature of about 15° C. to about 30° C. is preferred for the extraction. These temperatures will be designated in the present specification and claims as "cold temperatures" and the products produced will be designated as "cold" or "low temperature" coffee extracts or products.

In carrying out my improved process for making the soluble coffee extract about 600 parts by weight of freshly roasted coffee which has been ground to about 30 mesh is treated with about 400 parts by weight of water. It is preferred to introduce the ground, roasted coffee into a mixer and to spray in filtered water. After mixing thoroughly, the mixture is conveyed into a glass-lined percolator which is provided with a perforated plate near the bottom. The plate is preferably covered with a filtering medium such as a filter cloth. In the percolator, the mixture is allowed to digest for about two hours. This period, however, may be varied from about ½ hour to about 12 hours. During the digestion, the grains of coffee expand. To accommodate the foregoing expansion the percolator should be of sufficient size. For practical operations, a relatively tall percolator of sufficient capacity has been found to give satisfactory results. All necessary auxiliary equipment should be provided and adequate arrangement should be made to conduct the digestion and subsequent percolation in the presence of an inert atmosphere such as one of carbon dioxide. In this connection, it has been discovered that the best results are obtained when an inert atmosphere which is substantially devoid of oxygen is used.

After the digestion of about 2 hours or so, the coffee is packed down relatively firmly and is covered with a filter cloth and perforated plate. About 2400 parts by weight of filtered water is added while the stop-cock at the bottom of the percolator is kept opened. As soon as the percolate begins to flow the stop-cock is immediately closed. Substantially all of the air in the system is now flushed out with, say, carbon dioxide and the percolator and receiver system is sealed to prevent access of air. A return tube from the top of the receiver to the top of the percolator should be provided to permit displacement of carbon dioxide in the receiver by incoming percolate.

After further digestion of, say, about 4 hours, the percolation is begun by means of the stop-cock. This period, however, may vary from about ½ hour to about 48 hours. The rate of percolation is preferably adjusted to about 72 parts by weight per hour. When about 1760 parts by weight of percolate have been collected in about 24 hours practically all of the matter in the coffee which I desire to remove has been extracted. Of course, the time of percolation may be varied within wide limits. The coffee grounds or marc which retain about 1040 parts by weight of absorbed water is dumped by inverting the percolator which is mounted on trunnions.

The percolate which contains about 7% of dissolved solids is then concentrated in a pre-evaporator at about 40° C. and under a vacuum of about 28 inches (about 710 mm.) or so. For convenience, the pre-evaporator may have a capacity of about 400 parts by weight and the operation carried out in five batches. In practice, each batch has been found to take about an hour or so. The final volume of the concentrate is preferably about 240 parts by weight.

The syrupy concentrate is poured into shallow pans and is dried in a vacuum shelf drier at a low temperature of about 40° C. and under a vacuum of about 29 inches (about 735 mm.) or so. In carrying out this operation a drier having a capacity of about 80 parts by weight was used. Each batch required about 1½ hours or so for completion.

The dried coffee extract which comes from the vacuum shelf drier will be a porous dry mass which can be pulverized in a ball mill or other suitable apparatus. The pulverizing and subsequent handling of the dried extract should preferably be carried out in an air-conditioned room supplied with relatively dry air which prevents the sticking of the powder. If moisture is present, it will be absorbed by the fluffy powder which then tends to form a sticky mass.

A "cold" or "low temperature" coffee extract produced in accordance with my procedure possesses many desirable properties over the "hot" coffee extracts of the prior art. Thus, for instance, my "cold" or "low temperature" coffee extract is free from bitterness and does not have any caramelized or burnt or over-boiled taste. These defects are some of the principal shortcomings of most of the prior art soluble coffees. Furthermore, my "low temperature" coffee extract and process for making the same have the following advantages and possess the following desirable properties:—

1. Cold water removes less of certain constituents from the coffee, notably the oily constituents which, as is well known, are objectionable due to their tendency to produce gastric disturbances and nauseating effects.

2. Low temperature concentration helps retain more of certain valuable volatile constituents in the extract. These constituents contribute to characteristic qualities of a good cup of fresh coffee.

3. Greater economy and lower production costs.

4. The improved soluble, solid coffee extract does not deteriorate to any substantial extent on standing, if kept dry.

5. The improved soluble, solid coffee extract produces clearer coffee than prior products.

6. The improved soluble, solid coffee extract is free from bitterness and from caramelized, burnt or overboiled taste.

It is to be observed that the present invention provides a coffee ball which only requires a relatively small amount of coffee product to produce a cup of coffee in comparison with the amount required to produce a cup of coffee with an ordinary percolator or coffee pot. Thus only about 4.5 grams of my coffee product are required to make a cup of coffee whereas 9 to 15 grams of ground coffee are required to make a cup with a percolator.

It is also to be observed that the present invention provides a coffee ball in which the soluble coffee extract may be present from about 40% to about 90% and the coarsely ground, roasted coffee may be present from about 10% to about 60%.

Moreover, the present invention provides a coffee ball which is relatively small and which has even a reduced size after use which is in sharp contrast to certain prior coffee balls which swelled up when boiling water was poured in the coffee cup and which removed a substantial part of the cup of coffee when withdrawn.

It is to be observed that the improved coffee ball may be made large enough to make several cups of coffee at one time. In other words, a family size bag may be provided which is capable of producing several cups of coffee. Of course, one coffee bag or container may be used in making two or more cups of coffee, especially if strong coffee is not desired.

It is also to be noted that the present invention provides a coffee ball which does not deteriorate to any substantial extent on standing for relatively long periods of time, particularly if kept dry. In fact, the present coffee ball after standing for a period of time will produce as good or even a better cup of coffee than one produced from ordinary ground coffee kept in a tin can or the like for the same period of time. As yet it has not been definitely determined what fulfills the function of preserving my coffee combination, but it is believed that some of the soluble, solid coffee deliquesces in the moisture from the air and coats and preserves the crushed or coarsely ground, roasted coffee.

I claim:

1. As a new article of manufacture, an improved coffee combination for the instant production of clear coffee devoid of muddiness and suspended insoluble powder with hot water without the customary boiling which comprises a closed porous container; a charge of soluble, solid coffee product held within said porous container and adapted to dissolve in situ practically instantly when brought into contact with hot water and the dissolved coffee to pass through the pores of said container, said soluble coffee product being present in an amount sufficient to provide the "body" and natural color of a cup of coffee; and a charge of coarsely crushed roasted coffee held within said porous container and permanently associated with said soluble coffee in said porous container, said coarsely crushed roasted coffee being present in amount sufficient to impart the aroma and taste of freshly prepared roasted coffee beverage to the cup of subsequently prepared coffee beverage but insufficient to provide the body and natural color to said cup of coffee beverage, said coarsely crushed coffee and said soluble coffee being substantially devoid of finely ground roasted coffee and said combination being capable of making clear, consumable and palatable hot coffee devoid of muddiness and suspended insoluble powder directly in a cup by bringing hot water in contact with said container without the use of boiling in a conventional coffee pot.

2. As a new article of manufacture, an improved coffee combination for the instant production of clear coffee devoid of muddiness and suspended insoluble powder with hot water without customary boiling which comprises a closed porous container; a charge of soluble, disintegrated, solid "low temperature" coffee product held as within said porous container and adapted to dissolve in situ practically instantly when brought into contact with hot water and the dissolved coffee to pass through the pores of said container, said soluble coffee product being present in an amount sufficient to provide the "body" and natural color of a cup of coffee, and a charge of coarsely crushed roasted coffee held within said porous container and permanently associated with said soluble coffee in said porous container, said coarsely crushed roasted coffee being present in amount sufficient to impart the aroma and taste of freshly prepared roasted coffee beverage to the cup of subsequently prepared coffee beverage but insufficient to provide the body and natural color to said cup of coffee beverage, said coarsely crushed coffee and said soluble coffee being substantially devoid of finely ground roasted coffee, and said combination being capable of making clear, consumable and palatable hot coffee devoid of muddiness and suspended insoluble powder directly in a cup by bringing hot water in contact with said container without the use of boiling in a conventional coffee pot.

3. As a new article of manufacture, an improved coffee combination for the instant production of clear coffee devoid of muddiness and suspended insoluble powder with hot water without the customary boiling which comprises a closed gauze bag of open mesh; a charge of soluble, disintegrated, solid coffee product held within said gauze bag and adapted to dissolve in situ practically instantly when brought into contact with hot water and the dissolved coffee to pass through the pores of said container, said soluble coffee product being present in an amount sufficient to provide the "body" and natural color of a cup of coffee; and a charge of coarsely crushed roasted coffee held within said gauze bag and permanently associated with said soluble coffee in said gauze bag, said coarsely crushed roasted coffee being present in amount sufficient to impart the aroma and taste to freshly prepared roasted coffee beverage to the cup of subsequently prepared coffee but insufficient to provide the body and natural color to said cup of coffee, the said soluble coffee product constituting about 40% to about 90% by weight of the complete charge and the roasted coffee constituting about 10 to about 60% by weight of the complete charge, and said coarsely crushed coffee and said soluble coffee being substantially devoid of finely ground roasted coffee, and said combination being capable of making clear, consumable and palatable hot coffee devoid of muddiness and suspended insoluble powder directly in a cup by bringing hot water in contact with said gauze bag without the use of boiling in a conventional coffee pot.

4. As a new article of manufacture, an improved coffee combination for the instant production of clear coffee devoid of muddiness and suspended insoluble powder with hot water without the customary boiling which comprises a porous textile bag of about 50 mesh; a charge of about 2.5 grams of soluble, solid coffee product held within said porous textile bag and adapted to dissolve in situ practically instantly when brought into contact with hot water and the dissolved coffee to pass through the pores of said porous textile bag, said soluble coffee product being present in an amount sufficient to provide the "body" and natural color of a cup of coffee; and a charge of about 2 grams of roasted coffee coarsely crushed and screened to about 10 to about 25 mesh and held within said bag and permanently associated with said soluble coffee in said bag, said coarsely crushed coffee being present in amount sufficient to impart the aroma and taste of freshly prepared roasted coffee beverage to the cup of subsequently prepared coffee beverage but insufficient to provide the body and natural color to said cup of coffee beverage, said coarsely crushed roasted coffee and said soluble coffee being substantially devoid of finely ground coffee and said combination being capable of making clear, consumable and palatable hot coffee devoid of muddiness and suspended insoluble powder directly in a cup by bringing hot water in contact with said container without the use of boiling in a conventional coffee pot.

JOHN P. KANE.